(12) United States Patent
Melanson (10) Patent No.: US 8,198,874 B2
(45) Date of Patent: Jun. 12, 2012

(54) SWITCHING POWER CONVERTER WITH CURRENT SENSING TRANSFORMER AUXILIARY POWER SUPPLY

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 472 days.

(21) Appl. No.: 12/495,648

(22) Filed: Jun. 30, 2009

(65) Prior Publication Data

US 2010/0327838 A1 Dec. 30, 2010

(51) Int. Cl.
*G05F 1/46* (2006.01)
(52) U.S. Cl. .......................................... 323/222; 323/285
(58) Field of Classification Search .................. 323/222, 323/282, 285, 286, 287
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,409,476 A | 10/1983 | Lofgren et al. |
| 4,414,493 A | 11/1983 | Henrich |
| 4,476,706 A | 10/1984 | Hadden et al. |
| 4,523,128 A | 6/1985 | Stamm |
| 4,677,366 A | 6/1987 | Wilkinson et al. |
| 4,683,529 A | 7/1987 | Bucher |
| 4,697,210 A | 9/1987 | Toyota et al. |
| 4,700,188 A | 10/1987 | James |
| 4,737,658 A | 4/1988 | Kronmuller et al. |
| 4,797,633 A | 1/1989 | Humphrey |
| 4,937,728 A | 6/1990 | Leonardi |
| 4,940,929 A | 7/1990 | Williams |

(Continued)

FOREIGN PATENT DOCUMENTS

DE 19713814 10/1998

(Continued)

OTHER PUBLICATIONS http://toolbarpdf.com/docs/functions-and-features-of-inverters.html printed on Jan. 20, 2011.

(Continued)

*Primary Examiner* — Jeffrey Sterrett
(74) *Attorney, Agent, or Firm* — Andrew M. Harris; Mitch Harris, Atty at Law, LLC (57) ABSTRACT

A switching power converter having a current sensing transformer providing input to an auxiliary power supply provides efficient current sensing, while reducing the cost of the magnetic coupling element. The auxiliary power supply and current sense circuit both receive input from a secondary winding of a current sensing transformer having a primary winding coupled in series with the converter's main magnetic coupling element. To provide accurate sensing, the magnetization the current sensing transformer is accounted for. The magnetization is compensated for in the current sensing result, current sensing is performed during a part of the cycle in which charging of the auxiliary power supply is disabled, or the core of the current sensing transformer is made large, raising its mutual inductance. In another alternative technique, a circuit node can be pre-charged to a value that cancels the offset due to the magnetization current.

22 Claims, 5 Drawing Sheets

U.S. PATENT DOCUMENTS

| | | | |
|---|---|---|---|
| 4,973,919 | A | 11/1990 | Allfather |
| 4,979,087 | A | 12/1990 | Sellwood et al. |
| 4,980,898 | A | 12/1990 | Silvian |
| 499,952 | A | 2/1991 | Silva et al. |
| 4,992,919 | A | 2/1991 | Lee et al. |
| 5,001,620 | A | 3/1991 | Smith |
| 5,055,746 | A | 10/1991 | Hu et al. |
| 5,109,185 | A | 4/1992 | Ball |
| 5,121,079 | A | 6/1992 | Dargatz |
| 5,206,540 | A | 4/1993 | de Sa e Silva et al. |
| 5,264,780 | A | 11/1993 | Bruer et al. |
| 5,278,490 | A | 1/1994 | Smedley |
| 5,323,157 | A | 6/1994 | Ledzius et al. |
| 5,359,180 | A | 10/1994 | Park et al. |
| 5,383,109 | A | 1/1995 | Maksimovic et al. |
| 5,424,932 | A | 6/1995 | Inou et al. |
| 5,477,481 | A | 12/1995 | Kerth |
| 5,479,333 | A | 12/1995 | McCambridge et al. |
| 5,481,178 | A | 1/1996 | Wilcox et al. |
| 5,565,761 | A | 10/1996 | Hwang |
| 5,589,759 | A | 12/1996 | Borgato et al. |
| 5,638,265 | A | 6/1997 | Gabor |
| 5,691,890 | A | 11/1997 | Hyde |
| 5,747,977 | A | 5/1998 | Hwang |
| 5,757,635 | A | 5/1998 | Seong |
| 5,764,039 | A | 6/1998 | Choi et al. |
| 5,768,111 | A | 6/1998 | Zaitsu |
| 5,781,040 | A | 7/1998 | Myers |
| 5,783,909 | A | 7/1998 | Hochstein |
| 5,798,635 | A | 8/1998 | Hwang et al. |
| 5,834,858 | A | 11/1998 | Crosman, III et al. |
| 5,900,683 | A | 5/1999 | Rinehart et al. |
| 5,912,812 | A | 6/1999 | Moriarty, Jr. |
| 5,929,400 | A | 7/1999 | Colby et al. |
| 5,946,202 | A | 8/1999 | Balogh |
| 5,946,206 | A | 8/1999 | Shimizu et al. |
| 5,952,849 | A | 9/1999 | Haigh et al. |
| 5,960,207 | A | 9/1999 | Brown |
| 5,962,989 | A | 10/1999 | Baker |
| 5,963,086 | A | 10/1999 | Hall |
| 5,966,297 | A | 10/1999 | Minegishi |
| 5,994,885 | A | 11/1999 | Wilcox et al. |
| 6,016,038 | A | 1/2000 | Mueller et al. |
| 6,043,633 | A | 3/2000 | Lev et al. |
| 6,072,969 | A | 6/2000 | Yokomori et al. |
| 6,083,276 | A | 7/2000 | Davidson et al. |
| 6,084,450 | A | 7/2000 | Smith et al. |
| 6,091,233 | A | 7/2000 | Hwang |
| 6,125,046 | A | 9/2000 | Jang et al. |
| 6,150,774 | A | 11/2000 | Mueller et al. |
| 6,181,114 | B1 | 1/2001 | Hemena et al. |
| 6,211,626 | B1 | 4/2001 | Lys et al. |
| 6,211,627 | B1 | 4/2001 | Callahan |
| 6,229,271 | B1 | 5/2001 | Liu |
| 6,229,292 | B1 | 5/2001 | Redl et al. |
| 6,246,183 | B1 | 6/2001 | Buonavita |
| 6,259,614 | B1 | 7/2001 | Ribarich et al. |
| 6,300,723 | B1 | 10/2001 | Wang et al. |
| 6,304,066 | B1 | 10/2001 | Wilcox et al. |
| 6,304,473 | B1 | 10/2001 | Telefus et al. |
| 6,343,026 | B1 | 1/2002 | Perry |
| 6,344,811 | B1 | 2/2002 | Melanson |
| 6,369,525 | B1 | 4/2002 | Chang et al. |
| 6,385,063 | B1 | 5/2002 | Sadek et al. |
| 6,407,514 | B1 | 6/2002 | Glaser et al. |
| 6,407,515 | B1 | 6/2002 | Hesler |
| 6,407,691 | B1 | 6/2002 | Yu |
| 6,441,558 | B1 | 8/2002 | Muthu et al. |
| 6,445,600 | B2 | 9/2002 | Ben-Yaakov |
| 6,452,521 | B1 | 9/2002 | Wang |
| 6,469,484 | B2 | 10/2002 | L'Hermite et al. |
| 6,495,964 | B1 | 12/2002 | Muthu et al. |
| 6,509,913 | B2 | 1/2003 | Martin, Jr. et al. |
| 6,531,854 | B2 | 3/2003 | Hwang |
| 6,580,258 | B2 | 6/2003 | Wilcox et al. |
| 6,583,550 | B2 | 6/2003 | Iwasa et al. |
| 6,628,106 | B1 | 9/2003 | Batarseh et al. |
| 6,636,003 | B2 | 10/2003 | Rahm et al. |
| 6,646,848 | B2 | 11/2003 | Yoshida et al. |
| 6,657,417 | B1 | 12/2003 | Hwang |
| 6,688,753 | B2 | 2/2004 | Calon et al. |
| 6,713,974 | B2 | 3/2004 | Patchornik et al. |
| 6,724,174 | B1 | 4/2004 | Esteves et al. |
| 6,727,832 | B1 | 4/2004 | Melanson |
| 6,737,845 | B2 | 5/2004 | Hwang |
| 6,741,123 | B1 | 5/2004 | Anderson et al. |
| 6,753,661 | B2 | 6/2004 | Muthu et al. |
| 6,768,655 | B1 | 7/2004 | Yang et al. |
| 6,781,351 | B2 | 8/2004 | Mednik et al. |
| 6,788,011 | B2 | 9/2004 | Mueller et al. |
| 6,806,659 | B1 | 10/2004 | Mueller et al. |
| 6,839,247 | B1 | 1/2005 | Yang |
| 6,860,628 | B2 | 3/2005 | Robertson et al. |
| 6,870,325 | B2 | 3/2005 | Bushell et al. |
| 6,873,065 | B2 | 3/2005 | Haigh et al. |
| 6,882,552 | B2 | 4/2005 | Telefus et al. |
| 6,888,322 | B2 | 5/2005 | Dowling et al. |
| 6,894,471 | B2 | 5/2005 | Corva et al. |
| 6,933,706 | B2 | 8/2005 | Shih |
| 6,940,733 | B2 | 9/2005 | Schie et al. |
| 6,944,034 | B1 | 9/2005 | Shteynberg et al. |
| 6,956,750 | B1 | 10/2005 | Eason et al. |
| 6,958,920 | B2 | 10/2005 | Mednik et al. |
| 6,967,448 | B2 | 11/2005 | Morgan et al. |
| 6,970,503 | B1 | 11/2005 | Kalb |
| 6,975,079 | B2 | 12/2005 | Lys et al. |
| 6,975,523 | B2 | 12/2005 | Kim et al. |
| 6,980,446 | B2 | 12/2005 | Simada et al. |
| 7,003,023 | B2 | 2/2006 | Krone et al. |
| 7,034,611 | B2 | 4/2006 | Oswal et al. |
| 7,050,509 | B2 | 5/2006 | Krone et al. |
| 7,064,498 | B2 | 6/2006 | Dowling et al. |
| 7,064,531 | B1 | 6/2006 | Zinn |
| 7,072,191 | B2 | 7/2006 | Nakao et al. |
| 7,075,329 | B2 | 7/2006 | Chen et al. |
| 7,078,963 | B1 | 7/2006 | Andersen et al. |
| 7,088,059 | B2 | 8/2006 | McKinney et al. |
| 7,099,163 | B1 | 8/2006 | Ying |
| 7,102,902 | B1 | 9/2006 | Brown et al. |
| 7,106,603 | B1 | 9/2006 | Lin et al. |
| 7,109,791 | B1 | 9/2006 | Epperson et al. |
| 7,126,288 | B2 | 10/2006 | Ribarich et al. |
| 7,135,824 | B2 | 11/2006 | Lys et al. |
| 7,145,295 | B1 | 12/2006 | Lee et al. |
| 7,158,573 | B2 | 1/2007 | Hershbarger |
| 7,158,633 | B1 | 1/2007 | Hein |
| 7,161,816 | B2 | 1/2007 | Shteynberg et al. |
| 7,180,250 | B1 | 2/2007 | Gannon |
| 7,183,957 | B1 | 2/2007 | Melanson |
| 7,212,640 | B2 | 5/2007 | Bizjak |
| 7,221,130 | B2 | 5/2007 | Ribeiro et al. |
| 7,233,135 | B2 | 6/2007 | Noma et al. |
| 7,246,919 | B2 | 7/2007 | Porchia et al. |
| 7,255,457 | B2 | 8/2007 | Ducharm et al. |
| 7,266,001 | B1 | 9/2007 | Notohamiprodjo et al. |
| 7,272,585 | B2 | 9/2007 | Nomura et al. |
| 7,276,861 | B1 | 10/2007 | Shteynberg et al. |
| 7,288,902 | B1 | 10/2007 | Melanson |
| 7,289,054 | B1 | 10/2007 | Watanabe |
| 7,292,013 | B1 | 11/2007 | Chen et al. |
| 7,310,244 | B2 | 12/2007 | Yang et al. |
| 7,331,226 | B2 | 2/2008 | Feldman et al. |
| 7,345,458 | B2 | 3/2008 | Kanai et al. |
| 7,375,476 | B2 | 5/2008 | Walter et al. |
| 7,382,635 | B2 | 6/2008 | Noda |
| 7,394,210 | B2 | 7/2008 | Ashdown |
| 7,511,437 | B2 | 3/2009 | Lys et al. |
| 7,538,499 | B2 | 5/2009 | Ashdown |
| 7,545,130 | B2 | 6/2009 | Latham |
| 7,554,473 | B2 | 6/2009 | Melanson |
| 7,569,996 | B2 | 8/2009 | Holmes et al. |
| 7,583,136 | B2 | 9/2009 | Pelly |
| 7,656,103 | B2 | 2/2010 | Shteynberg et al. |
| 7,667,986 | B2 | 2/2010 | Artusi et al. |
| 7,710,047 | B2 | 5/2010 | Shteynberg et al. |
| 7,719,246 | B2 | 5/2010 | Melanson |
| 7,719,248 | B1 | 5/2010 | Melanson |

| Patent Number | Date | Inventor |
|---|---|---|
| 7,746,043 B2 | 6/2010 | Melanson |
| 7,746,671 B2 | 6/2010 | Radecker et al. |
| 7,750,738 B2 | 7/2010 | Bach |
| 7,756,896 B1 | 7/2010 | Feingold |
| 7,777,563 B2 | 8/2010 | Midya et al. |
| 7,804,256 B2 | 9/2010 | Melanson |
| 7,804,480 B2 | 9/2010 | Jeon et al. |
| 8,008,898 B2 * | 8/2011 | Melanson et al. ............ 323/222 |
| 2002/0065583 A1 | 5/2002 | Okada |
| 2002/0145041 A1 | 10/2002 | Muthu et al. |
| 2002/0150151 A1 | 10/2002 | Krone et al. |
| 2002/0166073 A1 | 11/2002 | Nguyen et al. |
| 2003/0095013 A1 | 5/2003 | Melanson et al. |
| 2003/0174520 A1 | 9/2003 | Bimbaud |
| 2003/0223255 A1 | 12/2003 | Ben-Yaakov |
| 2004/0004465 A1 | 1/2004 | McGinnis |
| 2004/0046683 A1 | 3/2004 | Mitamura et al. |
| 2004/0085030 A1 | 5/2004 | Laflamme et al. |
| 2004/0085117 A1 | 5/2004 | Melbert et al. |
| 2004/0169477 A1 | 9/2004 | Yanai et al. |
| 2004/0227571 A1 | 11/2004 | Kuribayashi |
| 2004/0228116 A1 | 11/2004 | Miller et al. |
| 2004/0232971 A1 | 11/2004 | Kawasaki et al. |
| 2004/0239262 A1 | 12/2004 | Ido et al. |
| 2005/0057237 A1 | 3/2005 | Clavel |
| 2005/0156770 A1 | 7/2005 | Melanson |
| 2005/0168492 A1 | 8/2005 | Hekstra et al. |
| 2005/0184895 A1 | 8/2005 | Petersen et al. |
| 2005/0197952 A1 | 9/2005 | Shea et al. |
| 2005/0207190 A1 | 9/2005 | Gritter |
| 2005/0222881 A1 | 10/2005 | Booker |
| 2005/0253533 A1 | 11/2005 | Lys et al. |
| 2005/0270813 A1 | 12/2005 | Zhang et al. |
| 2005/0275354 A1 | 12/2005 | Hausman, Jr. et al. |
| 2005/0275386 A1 | 12/2005 | Jepsen et al. |
| 2006/0002110 A1 | 1/2006 | Dowling |
| 2006/0022916 A1 | 2/2006 | Aiello |
| 2006/0023002 A1 | 2/2006 | Hara et al. |
| 2006/0116898 A1 | 6/2006 | Peterson |
| 2006/0125420 A1 | 6/2006 | Boone et al. |
| 2006/0184414 A1 | 8/2006 | Pappas et al. |
| 2006/0214603 A1 | 9/2006 | Oh et al. |
| 2006/0226795 A1 | 10/2006 | Walter et al. |
| 2006/0238136 A1 | 10/2006 | Johnson, III et al. |
| 2006/0261754 A1 | 11/2006 | Lee |
| 2006/0285365 A1 | 12/2006 | Huynh et al. |
| 2007/0024213 A1 | 2/2007 | Shteynberg et al. |
| 2007/0029946 A1 | 2/2007 | Yu et al. |
| 2007/0040512 A1 | 2/2007 | Jungwirth et al. |
| 2007/0053182 A1 | 3/2007 | Robertson |
| 2007/0055564 A1 | 3/2007 | Fourman |
| 2007/0103134 A1 * | 5/2007 | Yang et al. .................... 323/282 |
| 2007/0103949 A1 | 5/2007 | Tsuruya |
| 2007/0124615 A1 | 5/2007 | Orr |
| 2007/0126656 A1 | 6/2007 | Huang et al. |
| 2007/0182699 A1 | 8/2007 | Ha et al. |
| 2007/0231009 A1 | 10/2007 | Watahiki |
| 2007/0285031 A1 | 12/2007 | Shteynberg et al. |
| 2008/0012502 A1 | 1/2008 | Lys |
| 2008/0027841 A1 | 1/2008 | Eder |
| 2008/0043504 A1 | 2/2008 | Ye et al. |
| 2008/0054815 A1 | 3/2008 | Kotikalapoodi et al. |
| 2008/0116818 A1 | 5/2008 | Shteynberg et al. |
| 2008/0130322 A1 | 6/2008 | Artusi et al. |
| 2008/0130336 A1 | 6/2008 | Taguchi |
| 2008/0150433 A1 | 6/2008 | Tsuchida et al. |
| 2008/0154679 A1 | 6/2008 | Wade |
| 2008/0174291 A1 | 7/2008 | Hansson et al. |
| 2008/0174372 A1 | 7/2008 | Tucker et al. |
| 2008/0175029 A1 | 7/2008 | Jung et al. |
| 2008/0192509 A1 | 8/2008 | Dhuyvetter et al. |
| 2008/0224635 A1 | 9/2008 | Hayes |
| 2008/0232141 A1 | 9/2008 | Artusi et al. |
| 2008/0239764 A1 | 10/2008 | Jacques et al. |
| 2008/0259655 A1 | 10/2008 | Wei et al. |
| 2008/0278132 A1 | 11/2008 | Kesterson et al. |
| 2009/0067204 A1 | 3/2009 | Ye et al. |
| 2009/0070188 A1 | 3/2009 | Scott et al. |
| 2009/0174479 A1 | 7/2009 | Yan et al. |
| 2009/0190379 A1 * | 7/2009 | Melanson et al. ......... 363/21.13 |
| 2009/0190384 A1 | 7/2009 | Thompson |
| 2009/0191837 A1 | 7/2009 | Nanda et al. |
| 2009/0218960 A1 | 9/2009 | Lyons et al. |
| 2010/0141317 A1 | 6/2010 | Szajnowski |
| 2010/0327838 A1 * | 12/2010 | Melanson .................... 323/311 |

FOREIGN PATENT DOCUMENTS

| | | |
|---|---|---|
| EP | 0632679 | 1/1995 |
| EP | 0838791 | 4/1998 |
| EP | 1014563 | 6/2000 |
| EP | 1164819 | 12/2001 |
| EP | 1213823 | 6/2002 |
| EP | 1460775 | 9/2004 |
| EP | 1528785 | 5/2005 |
| EP | 1768257 A1 | 3/2007 |
| EP | 2204905 A1 | 7/2010 |
| GB | 2069269 | 8/1981 |
| GB | 2262673 A | 6/1993 |
| WO | WO 91/13417 | 9/1991 |
| WO | WO9725836 | 7/1997 |
| WO | WO 97/42714 | 11/1997 |
| WO | WO 01/15316 | 1/2001 |
| WO | WO 01/84697 | 11/2001 |
| WO | WO 01/97384 | 12/2001 |
| WO | WO 02/15386 | 2/2002 |
| WO | WO 02/27944 | 4/2002 |
| WO | WO 02/091805 | 11/2002 |
| WO | WO2006013557 | 2/2006 |
| WO | WO 2006/135584 | 12/2006 |
| WO | WO 2007/026170 | 3/2007 |
| WO | WO2008072160 | 6/2008 |
| WO | WO20080152838 | 12/2008 |

OTHER PUBLICATIONS

Maksimovic, et al., "Impact of Digital Control in Power Electronics", Proceedings of the 2004 International Symposium on Power Semiconductor Devices & ICs, pp. 13-22, Kitakyushu, JP, 2004.

L6562 Datasheet, "Transition-Mode PFC Controller", ST Microelectronics, Nov. 2005, Geneva, Switzerland.

U.S. Appl. No. 12/495,720, filed Jun. 30, 2009, Melanson.

U.S. Appl. No. 12/493,045, filed Jun. 26, 2009, Melanson.

"AN-H52 Application Note: HV9931 Unity Power Factor LED Lamp Driver" Mar. 7, 2007, Supertex Inc., Sunnyvale, CA, USA.

A. Prodic, Compensator Design and Stability Assessment for Fast Voltage Loops of Power Factor Correction Rectifiers, IEEE Transactions on Power Electronics, vol. 22, No. 5, Sep. 2007.

A. R. Seidel, et al., A Practical Comparison Among High-Power-Factor Electronic Ballasts with Similar Ideas, IEEE Transactions on Industry Applications, vol. 41, No. 6, Nov.-Dec. 2005.

A. Silva De Morais, et al., A High Power Factor Ballast Using a Single Switch with Both Power Stages Integrated, IEEE Transactions on Power Electronics, vol. 21, No. 2, Mar. 2006.

Abramovitz, et al., "A Resonant DC-DC Transformer With Zero Current Ripple", IEEE Transactions on Power Electronics, Nov. 2007, p. 2344-2351, vol. 22, No. 6.

AD7400 Datasheet, "Isolated Sigma-Delta Modulator", Analog Devices 2006.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.

Analog Devices, "120 kHz Bandwidth, Low Distortion, Isolation Amplifier", AD215, Norwood, MA, 1996.

Analog Devices, "Isolated Sigma-Delta Modulator", AD7400, Analog Devices, Norwood, MA, 2006.

Azoteq, IQS17 Family, IQ Switch®—ProxSense™ Series, Touch Sensor, Load Control and User Interface, IQS17 Datasheet V2.00. doc, Jan. 2007.

B.A. Miwa, et al., High Efficiency Power Factor Correction Using Interleaved Techniques, Applied Power Electronics Conference and Exposition, Seventh Annual Conference Proceedings, Feb. 23-27, 1992.

Barragan et al., "Efficiency Optimization in ZVS Series Resonant Inverters With Asymmetrical Voltage-Cancellation Control", IEEE Transactions on Power Electronics, Sep. 2005, p. 1036-1044, vol. 20, No. 5.

BB3656 Datasheet "Transformer Coupled Isolation Amplifier", Burr-Brown 1987.

Bhat, et al., "Analysis and Design of a High-Frequency Resonant Converter Using LCC-Type Commutation", IEEE Transactions on Power Electronics, Oct. 1987, p. 291-301, vol. PE-2 No. 4.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

C. Dilouie, Introducing the LED Driver, EC&M, Sep. 2004.

C. M. De Oliviera Stein, et al., A ZCT Auxiliary Communication Circuit for Interleaved Boost Converters Operating in Critical Conduction Mode, IEEE Transactions on Power Electronics, vol. 17, No. 6, Nov. 2002.

Chen, et al., "Generalized Optimal Trajectory Control for Closed Loop Control of Series-Parallel Resonant Converter", IEEE Transactions on Power Electronics, Sep. 2006, p. 1347-1355, vol. 21, No. 5.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

Color Temperature, www.sizes.com/units/color_temperature.htm, printed Mar. 27, 2007.

D. Hausman, Lutron, RTISS-TE Operation, Real-Time Illumination Stability Systems for Trailing-Edge (Reverse Phase Control) Dimmers, v. 1.0 Dec. 2004.

D. Maksimovic, et al., "Switching Converters with Wide DC Conversion Range," Institute of Electrical and Electronic Engineer's (IEEE) Transactions on Power Electronics, Jan. 1991.

D. Rand, et al., Issues, Models and Solutions for Triac Modulated Phase Dimming of LED Lamps, Power Electronics Specialists Conference, 2007.

D.K.W. Cheng, et al., A New Improved Boost Converter with Ripple Free Input Current Using Coupled Inductors, Power Electronics and Variable Speed Drives, Sep. 21-23, 1998.

Dallas Semiconductor, Maxim, "Charge-Pump and Step-Up DC-DC Converter Solutions for Powering White LEDs in Series or Parallel Connections," Apr. 23, 2002.

Data Sheet LT3496 Triple Output LED Driver, Linear Technology Corporation, Milpitas, CA 2007.

De Groot, et al., "Design of a 1-MHz LLC Resonant Converter Based on a DSP-Driven SOI Half-Bridge Power MOS Module", IEEE Transactions on Power Electronics, Nov. 2007, p. 2307-2320, vol. 22 No. 4.

Doyle, et al., Feedback Control Theory, Macmillan Publishing Co., 1990.

Dunn, Jamie, "Determining MOSFET Driver Needs for Motor Drive Applications," AN898 Application Note, Microchip Technology, Chandler, AZ, 2003.

Erickson, Robert W., et al., "Fundamentals of Power Electronics," Second Edition, Chapter 6, Boulder, CO, 2001.

F. T. Wakabayashi, et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.

F. Tao, et al., "Single-Stage Power-Factor-Correction Electronic Ballast with a Wide Continuous Dimming Control for Fluorescent Lamps," IEEE Power Electronics Specialists Conference, vol. 2, 2001.

Fairchild Semiconductor, Application Note 42030, Theory and Application of the ML4821 Average Current Mode PFC Controller, Oct. 25, 2000.

Fairchild Semiconductor, Application Note 42047 Power Factor Correction (PFC) Basics, Rev. 0.9.0 Aug. 19, 2004.

Fairchild Semiconductor, Application Note 6004, 500W Power-Factor-Corrected (PFC) Converter Design with FAN4810, Rev. 1.0.1, Oct. 31, 2003.

Fairchild Semiconductor, Application Note AN4121, Design of Power Factor Correction Circuit Using FAN7527B, Rev.1.0.1, May 30, 2002.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVS Average Current PFC Controller, Aug. 10, 2001.

Fairchild Semiconductor, FAN7527B, Power Factor Correction Controller, 2003.

Fairchild Semiconductor, FAN7532, Ballast Controller, Rev. 1.0.2, Jun. 2006.

Fairchild Semiconductor, FAN7544, Simple Ballast Controller, Rev. 1.0.0, 2004.

Fairchild Semiconductor, FAN7711, Ballast Control IC, Rev. 1.0.2, Mar. 2007.

Fairchild Semiconductor, KA7541, Simple Ballast Controller, Rev. 1.0.3, 2001.

Fairchild Semiconductor, ML4812, Power Factor Controller, Rev. 1.0.4, May 31, 2001.

Fairchild Semiconductor, ML4821, Power Factor Controller, Rev. 1.0.2, Jun. 19, 2001.

Feng, et al., "Ultra Fast Fixed-Frequency Hysteretic Buck Converter With Maximum Charging Current Control and Adaptive Delay Compensation for DVS Applications", IEEE JSSC, IEEE Press, New Jersey, Nov. 2001.

Foster, et al.,, "Cyclic-Averaging for High Speed Analysis of Resonant Converters", IEEE Transactions on Power Electronics, Jul. 2003, p. 985-993, vol. 18, No. 4.

Freescale Semiconductor, AN1965, Design of Indirect Power Factor Correction Using 56F800/E, Jul. 2005.

Freescale Semiconductor, AN3052, Implementing PFC Average Current Mode Control Using the MC9S12E128, Nov. 2005.

Freescale Semiconductor, Inc., Dimmable Light Ballast with Power Factor Correction, Design Reference Manual, DRM067, Rev. 1, Dec. 2005.

G. Yao, et al., Soft Switching Circuit for Interleaved Boost Converters, IEEE Transactions on Power Electronics, vol. 22, No. 1, Jan. 2007.

Gu, et al., "Three-Level LLC Series Resonant DC/DC Converter," IEEE Transactions on Power Electronics, vol. 20, No. 4, p. 781-789, Jul. 2005.

H. L. Cheng, et al., A Novel Single-Stage High-Power-Factor Electronic Ballast with Symmetrical Topology, IEEE Transactions on Power Electronics, vol. 50, No. 4, Aug. 2003.

H. Peng, et al., Modeling of Quantization Effects in Digitally Controlled DC-DC Converters, IEEE Transactions on Power Electronics, vol. 22, No. 1, Jan. 2007.

H. Wu, et al., Single Phase Three-Level Power Factor Correction Circuit with Passive Lossless Snubber, IEEE Transactions on Power Electronics, vol. 17, No. 2, Mar. 2006.

Hattrup, et al., "Fast Estimation Techniques for Digital Control of Resonant Converters", IEEE Transactions on Power Electronics, Jan. 2003, p. 365-372, vol. 18, No. 1.

Hirota, Atsushi, et al., "Analysis of Single Switch Delta-Sigma Modulated Pulse Space Modulation PFC Converter Effectively Using Switching Power Device," IEEE, US, 2002.

Infineon, CCM-PFC Standalone Power Factor Correction (PFC) Controller in Continuous Conduction Mode (CCM), Version 2.1, Feb. 6, 2007.

International Rectifier, Application Note AN-1077,PFC Converter Design with IR1150 One Cycle Control IC, rev. 2.3, Jun. 2005.

International Rectifier, Data Sheet No. PD60230 revC, IR1150(S)(PbF), uPFC One Cycle Control PFC IC Feb. 5, 2007.

International Rectifier, Data Sheet PD60230 revC, Feb. 5, 2007.

International Rectifier, IRAC1150-300W Demo Board, User's Guide, Rev 3.0, Aug. 2, 2005.

Intersil, "Designing with the ISL6752, ISL6753 ZVS Full-Bridge Controllers," Application Note AN1262.0, Aug. 15,2006.

J. A. Vilela Jr., et al., An Electronic Ballast with High Power Factor and Low Voltage Stress, IEEE Transactions on Industry Applications, vol. 41, No. 4, Jul./Aug. 2005.

J. Qian, et al., Charge Pump Power-Factor-Correction Technologies Part II: Ballast Applications, IEEE Transactions on Power Electronics, vol. 15, No. 1, Jan. 2000.
J. Qian, et al., New Charge Pump Power-Factor-Correction Electronic Ballast with a Wide Range of Line Input Voltage, IEEE Transactions on Power Electronics, vol. 14, No. 1, Jan. 1999.
J. Turchi, Four Key Steps to Design a Continuous Conduction Mode PFC Stage Using the NCP1653, on Semiconductor, Publication Order No. AND184/D, Nov. 2004.
J. Zhou, et al., Novel Sampling Algorithm for DSP Controlled 2 kW PFC Converter, IEEE Transactions on Power Electronics, vol. 16, No. 2, Mar. 2001.
J.W.F. Dorleijn, et al., Standardisation of the Static Resistances of Fluorescent Lamp Cathodes and New Data for Preheating, Industry Applications Conference, vol. 1, Oct. 13, 2002-Oct. 18, 2002.
K. Leung, et al., "Dynamic Hysteresis Band Control of the Buck Converter with Fast Transient Response," IEEE Transactions on Circuits and Systems—II: Express Briefs, vol. 52, No. 7, Jul. 2005.
K. Leung, et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.
K.M. Smedley, One-Cycle Control of Switching Converters, IEEE Transactions on Power Electronics, vol. 10, No. 6, Nov. 1995.
L. Balogh, et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.
L. Gonthier, et al., EN55015 Compliant 500W Dimmer with Low-Losses Symmetrical Switches, 2005 European Conference on Power Electronics and Applications, Sep. 2005.
Laouamri, et al., "Modeling and Analysis of Wound Integrated LCT Structure for Single Stage Resonant PFC Rectifier", IEEE Transactions on Power Electronics, Jan. 2003, p. 256-269, vol. 18, No. 1.
Light Dimmer Circuits, www.epanorama.net/documents/lights/lightdimmer.html, printed Mar. 26, 2007.
Light Emitting Diode, http://en.wikipedia.org/wiki/Light-emitting_diode, printed Mar. 27, 2007.
Lin, et al., "Robust Controller Design for a Series Resonant Converter via Duty-Cycle Control", IEEE Transactions on Power Electronics, Sep. 1999, p. 793-802, vol. 14 No. 5.
Linear Technology, "Single Switch PWM Controller with Auxiliary Boost Converter," LT1950 Datasheet, Linear Technology, Inc., Milpitas, CA, 2003.
Linear Technology, 100 Watt LED Driver, Linear Technology, 2006.
Linear Technology, LT1248, Power Factor Controller, Apr. 20, 2007.
Linear Technology, News Release,Triple Output LED, LT3496, Linear Technology, Milpitas, CA, May 24, 2007.
Linear Technology,"2-Switch Forward Controller and Gate Driver," LTC3705 Datasheet, Linear Technology, Inc., Milpitas, CA, 2005.
Lu, et al., International Rectifier, Bridgeless PFC Implementation Using One Cycle Control Technique, 2005.
M. Brkovic, et al., "Automatic Current Shaper with Fast Output Regulation and Soft-Switching," S.15.0 Power Converters, Telecommunications Energy Conference, 1993.
M. K. Kazimierczuk, et al., Electronic Ballast for Fluorescent Lamps, IEEETransactions on Power Electronics, vol. 8, No. 4, Oct. 1993.
M. Madigan, et al., Integrated High-Quality Rectifier-Regulators, IEEE Transactions on Industrial Electronics, vol. 46, No. 4, Aug. 1999.
M. Ponce, et al., High-Efficient Integrated Electronic Ballast for Compact Fluorescent Lamps, IEEE Transactions on Power Electronics, vol. 21, No. 2, Mar. 2006.
M. Radecker, et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.
M. Rico-Secades, et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.
Mammano, B., Resonant Mode Converter Topologies, Texas Instruments, 2001.
Mangat, et al., "A Modified Asymmetrical Pulse-Width-Modulated Resonant DC/DC Converter Topology", IEEE Transactions on Power Electronics, Jan. 2004, p. 104-111, vol. 19, No. 1.
Megaman, D or S Dimming ESL, Product News, Mar. 15, 2007.
National Lighting Product Information Program, Specifier Reports, "Dimming Electronic Ballasts," vol. 7, No. 3, Oct. 1999.
Noon, Jim "UC3855A/B High Performance Power Factor Preregulator", Texas Instruments, SLUA146A, May 1996,Revised Apr. 2004.
NXP, TEA1750, GreenChip III SMPS control IC Product Data Sheet, Apr. 6, 2007.
O. Garcia, et al., High Efficiency PFC Converter to Meet EN61000-3-2 and A14, Proceedings of the 2002 IEEE International Symposium on Industrial Electronics, vol. 3, 2002.
On Semconductor, NCP1606, Cost Effective Power Factor Controller, Mar. 2007.
On Semiconductor, AND8123/D, Power Factor Correction Stages Operating in Critical Conduction Mode, Sep. 2003.
On Semiconductor, MC33260, GreenLine Compact Power Factor Controller: Innovative Circuit for Cost Effective Solutions, Sep. 2005.
On Semiconductor, NCP1605, Enhanced, High Voltage and Efficient Standby Mode, Power Factor Controller, Feb. 2007.
On Semiconductor, NCP1654, Product Review, Power Factor Controller for Compact and Robust, Continuous Conduction Mode Pre-Converters, Mar. 2007.
P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.
P. Lee, et al., Steady-State Analysis of an Interleaved Boost Converter with Coupled Inductors, IEEE Transactions on Industrial Electronics, vol. 47, No. 4, Aug. 2000.
Philips, Application Note, 90W Resonant SMPS with TEA1610 SwingChip, AN99011, 1999.
Power Integrations, Inc., "TOP200-4/14 TOPSwitch Family Three-terminal Off-line PWM Switch", XP-002524650, Jul. 1996, Sunnyvale, California.
Power Supply Design Tutorial, SMPS Block Diagram, Basic Concepts, Theory of Operation, http://www.smps.us/power-supply.html, printed Aug. 11, 2008.
Prodic, A, et al., "Dead Zone Digital Controller for Improved Dynamic Response of Power Factor Preregulators," IEEE, 2003.
Prodic, Aleksandar, "Digital Controller for High-Frequency Rectifiers with Power Factor Correction Suitable for On-Chip Implementation," IEEE, US, 2001.
Q. Li, et al., An Analysis of the ZVS Two-Inductor Boost Converter under Variable Frequency Operation, IEEE Transactions on Power Electronics, vol. 22, No. 1, Jan. 2007.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
Renesas, HA16174P/FP, Power Factor Correction Controller IC, Jan. 6, 2006.
S. Ben-Yaakov, et al., Statics and Dynamics of Fluorescent Lamps Operating at High Frequency: Modeling and Simulation, IEEE Transactions on Industry Applications, vol. 38, No. 6, Nov.-Dec. 2002.
S. Chan, et al., Design and Implementation of Dimmable Electronic Ballast Based on Integrated Inductor, IEEE Transactions on Power Electronics, vol. 22, No. 1, Jan. 2007.
S. Dunlap, et al., Design of Delta-Sigma Modulated Switching Power Supply, Circuits & Systems, Proceedings of the 1998 IEEE International Symposium, 1998.
S. Lee, et al., A Novel Electrode Power Profiler for Dimmable Ballasts Using DC Link Voltage and Switching Frequency Controls, IEEE Transactions on Power Electronics, vol. 19, No. 3, May 2004.
S. Lee, et al., TRIAC Dimmable Ballast with Power Equalization, IEEE Transactions on Power Electronics, vol. 20, No. 6, Nov. 2005.
S. Skogstad, et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

S. T.S. Lee, et al., Use of Saturable Inductor to Improve the Dimming Characteristics of Frequency-Controlled Dimmable Electronic Ballasts, IEEE Transactions on Power Electronics, vol. 19, No. 6, Nov. 2004.

S. Zhou, et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

ST Microelectronics, AN993, Application Note, Electronic Ballast with PFC Using L6574 and L6561, May 2004.

ST Microelectronics, L6574, CFL/TL Ballast Driver Preheat and Dimming, Sep. 2003.

ST Microelectronics, Power Factor Corrector L6561, Jun. 2004.

ST Microelectronics, L6563, Advanced Transition-Mode PFC Controller, Mar. 2007.

Supertex Inc., 56W Off-line LED Driver, 120VAC with PFC, 160V, 350mA Load, Dimmer Switch Compatible, DN-H05, Feb. 2007.

Supertex Inc., Buck-based LED Drivers Using the HV9910B, Application Note AN-H48, Dec. 28, 2007.

T. Wu, et al., Single-Stage Electronic Ballast with Dimming Feature and Unity Power Factor, IEEE Transactions on Power Electronics, vol. 13, No. 3, May 1998.

Texas Instruments, BiCMOS Advanced Phase-Shift PWM Controller Datasheet, Dec. 1999, Rev. Apr. 2008.

Texas Instruments, "BiCMOS Advanced Phase-Shift PWM Controller Datasheet," UCC1895, UCC2895, UCC3895, Dec. 1999, Rev. Apr. 2008.

Texas Instruments, Application Note SLUA321, Startup Current Transient of the Leading Edge Triggered PFC Controllers, Jul. 2004.

Texas Instruments, Application Report SLUA308, UCC3817 Current Sense Transformer Evaluation, Feb. 2004.

Texas Instruments, Application Report SLUA369B, 350-W, Two-Phase Interleaved PFC Pre-Regulator Design Review, Mar. 2007.

Texas Instruments, Application Report SPRA902A, Average Current Mode Controlled Power Factor Correctiom Converter using TMS320LF2407A, Jul. 2005.

Texas Instruments, Application Report, SLUA309A, Avoiding Audible Noise at Light Loads when using Leading Edge Triggered PFC Converters, Sep. 2004.

Texas Instruments, SLOS318F, "High-Speed, Low Noise, Fully-Differential I/O Amplifiers," THS4130 and THS4131, US, Jan. 2006.

Texas Instruments, SLUS828B, "8-Pin Continuous Conduction Mode (CCM) PFC Controller", UCC28019A, US, revised Apr. 2009.

Texas Instruments, Transition Mode PFC Controller, SLUS515D, Jul. 2005.

Texas Instruments, UCC3817 BiCMOS Power Factor Preregulator Evaluation Board User's Guide, Nov. 2002.

Tuomainen, et al., "Effect of Resonant Transition on Efficiency of Forward Converter with Active Clamp and Self-Driven SRs", IEEE Transactions on Power Electronics, Mar. 2005, p. 315-323, vol. 20, No. 2.

Unitrode Products From Texas Instruments, High Performance Power Factor Preregulator, Oct. 2005.

Unitrode Products From Texas Instruments, Programmable Output Power Factor Preregulator, Dec. 2004.

Unitrode, Design Note DN-39E, Optimizing Performance in UC3854 Power Factor Correction Applications, Nov. 1994.

Unitrode, High Power-Factor Preregulator, Oct. 1994.

Unitrode, L. Balogh, Design Note UC3854A/B and UC3855A/B Provide Power Limiting with Sinusoidal Input Current for PFC Front Ends, SLUA196A, Nov. 2001.

V. Nguyen, et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.

Mamano, Bob, "Current Sensing Solutions for Power Supply Designers", Unitrode Seminar Notes SEM1200, 1999.

Texas Instruments, Interleaving Continuous Conduction Mode PFC Controller, UCC28070, SLUS794C, Nov. 2007, revised Jun. 2009, Texas Instruments, Dallas TX.

* cited by examiner

SWITCHING POWER CONVERTER WITH CURRENT SENSING TRANSFORMER AUXILIARY POWER SUPPLY

BACKGROUND OF THE INVENTION

1. Field of the Invention

The present invention relates generally to switching power converter circuits, and more specifically, to a switching power converter in which an auxiliary winding power supply and a current sensing circuit receive input from the same current sensing transformer secondary winding.

2. Background of the Invention

Operation of switching power converters in continuous conduction mode (CCM) is desirable for efficiency and to reduce the peak current levels in the converter for reliability and reduction of component costs. In CCM operation, the current through the magnetic coupling element never changes polarity and typically never fully drops to zero. Since the current is never permitted to reach zero, saturation of the magnetic coupling element can occur if an increasing magnetic flux progressively accumulates in the magnetic coupling element at the end of each switching cycle, a phenomenon sometimes referred to as "flux walking." Eventually the core of the magnetic coupling element will saturate, causing the magnetic coupling element to appear as a short circuit, resulting in failure of the switching circuits. Therefore, in CCM operation, detection of the peak current, or another reference current level, through the series circuit formed by the magnetic storage element and the switching circuit is needed. The peak current value determines the off cycle period needed to discharge the inductor. In discontinuous conduction mode (DCM), there is always a period of zero current flowing in the magnetic coupling element, and therefore the core of the magnetic coupling element always resets to zero at each cycle.

In order to sense the current through the magnetic coupling element, a sense resistor may be inserted into the series switching circuit, or an additional current sensing transformer can be provided. The current sensing transformer approach is typically more efficient than the approach of adding a current sense resistor, as the transformer and current sensing circuit are designed to produce minimal disturbance and loss in the power switching circuit. A current sensing transformer primary winding typically includes only a few turns, so the voltage across the primary winding is small. The secondary winding of the current sensing transformer generally produces a voltage on the order of a volt or less, so that the magnetization current of the current sensing transformer (also referred to as the magnetizing current) can be disregarded. Therefore, the secondary current of the typical current sense transformer is substantially proportional to the primary current, so that a voltage generated across a resistor connected across the secondary of the current sensing transformer is linearly related to the primary current and provides a measure of the current passing through the primary winding of the main magnetic coupling element of the converter.

In order to supply power to control circuits of a switching power converter, a low voltage power supply is needed. When the only voltage available or convenient is a high-voltage power supply, or when isolation of the auxiliary power supply is required, an auxiliary winding on the main magnetic coupling element of the switching converter is commonly used to supply power to the control circuits. However, including an auxiliary winding increases the cost of the magnetic coupling element. In contrast to the characteristics of the secondary winding in the above-described current sensing transformer, as the auxiliary power supply typically must provide a voltage on the order of 10V and also generate substantial current, on the order of tens or hundreds of milliamps. Therefore, an auxiliary winding generally has substantial magnetization current, and the voltage across the typical auxiliary winding does not provide an accurate indication of the current flowing through the primary winding of the main magnetic coupling element of the switching power converter.

Therefore, it would be desirable to provide an auxiliary power supply in a switching power converter having a current sense transformer without requiring an auxiliary winding on the main magnetic coupling element of the switching power converter.

SUMMARY OF THE INVENTION

The above stated objective of providing an auxiliary power supply circuit and a current sensing circuit without requiring a sense resistor or an auxiliary winding on the main magnetic coupling element of a switching converter, is provided in a switching converter and a method of operation of the switching converter.

The switching converter has a magnetic coupling element coupled in series with a switching circuit and a current sensing transformer. The current sensing transformer secondary winding is provided to an auxiliary power supply circuit and also provides input to a current sensing circuit. In order to provide current sensing functionality in the face of a significant magnetization current due to the higher voltage required for auxiliary power supply charging, the current through the auxiliary winding is either corrected for the magnetization current, the current sensing is performed while charging of the auxiliary power supply is disabled, the inductance of the current sensing transformer is made large, or the offset due to the magnetization current is compensated for by pre-charging a circuit node to an opposing offset.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present invention encompasses switching power converters having an auxiliary power supply operated from a winding of a current sensing transformer. The current sensing transformer is coupled in series with the switching circuit and main magnetic coupling element of the converter. The present invention also includes methods for providing power to control and/or other circuits internal to a switching power converter from a current sensing transformer.

Figure 1:
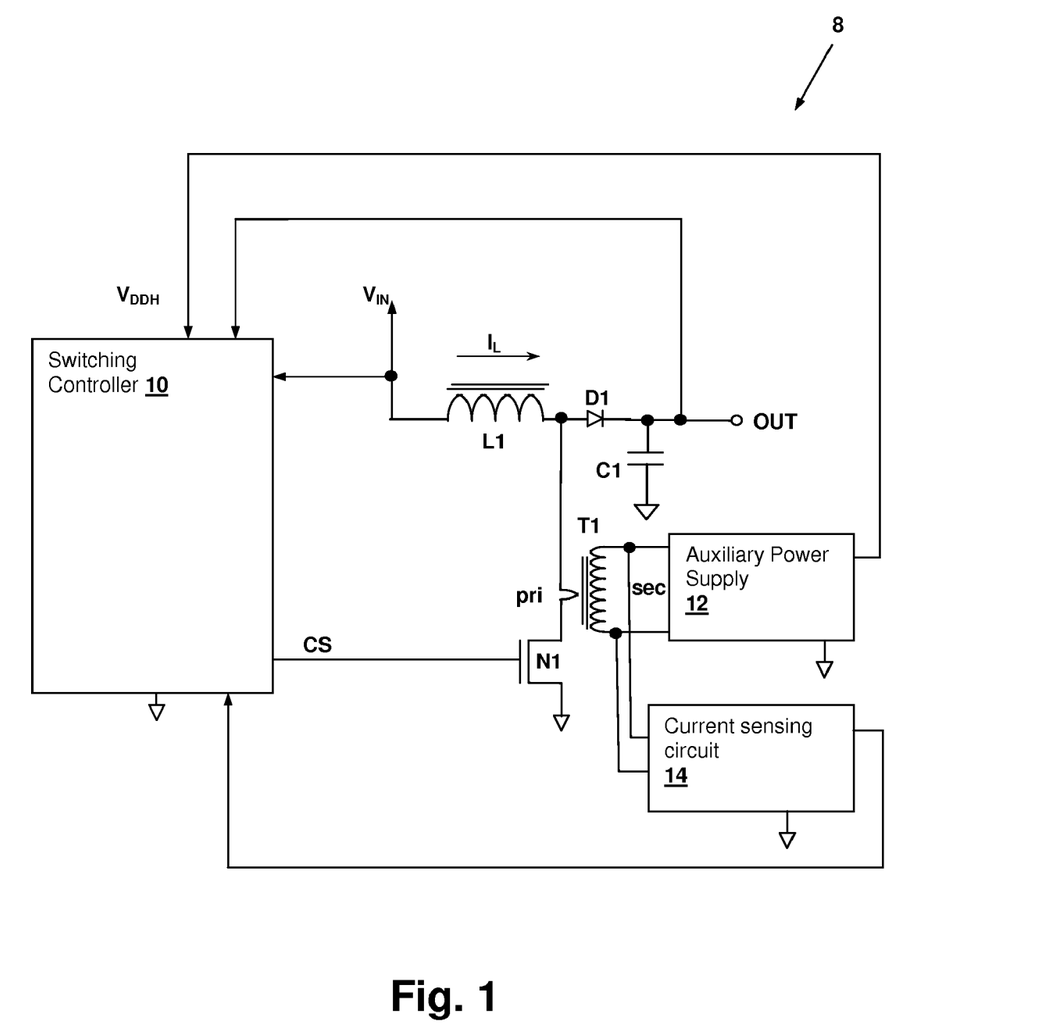
FIG. 1 is a block diagram depicting a switching converter in accordance with an embodiment of the present invention.

Referring now to FIG. 1, a switching power converter 8 in accordance with an embodiment of the present invention is shown. A switching controller 10 provides a switching control signal CS that controls a switching circuit implemented by a transistor N1. When transistor N1 is active, a magnetic coupling element implemented by inductor L1 is charged by imposing input voltage $V_{IN}$ across inductor L1, causing a current $I_L$ through inductor L1 to linearly increase. When transistor N1 is deactivated, charge is pushed through inductor L1 and diode D1 into capacitor C1, raising the voltage at output terminal OUT. A current-sensing transformer T1 is connected in series with transistor N1 and inductor L1 to provide a signal indicating the magnitude and polarity of current $I_L$ through inductor L1 without introducing significant losses, as would otherwise be present if a series resistor were used to produce such a signal.

Switching power converter 8 is a boost converter circuit that can control the voltage provided to output terminal OUT in conformity with a feedback voltage provided from terminal OUT. Alternatively, switching power converter 8 may be controlled entirely by current-mode feedback. In the illustrated application, the boost converter circuit is a power-factor corrector (PFC) that provides a high voltage DC output from alternating current (AC) power line input voltage $V_{IN}$. Switching controller 10 operates transistor N1 to maintain a phase relationship of zero degrees between input voltage $V_{IN}$ and the input current. A current sensing circuit 14 provides an indication of the magnitude of current $I_L$ derived from an input voltage received from secondary winding sec of current sensing transformer T1. An auxiliary power supply 12, supplies a voltage $V_{DDH}$ to switching controller 10, and is generally integrated in the same integrated circuit (IC) with switching controller 10 and current sensing circuit 14. The inputs of auxiliary power supply 12 are also connected to secondary winding sec of current sensing transformer T1. Unlike typical current sensing transformers, current sensing transformer T1 has a higher turns ratio, so that a voltage $V_{DDH}$ can be generated by auxiliary power supply 12 sufficient to operate control circuits in a controller IC, including switching controller 10, which contains the gate drive circuit needed to control switching of transistor N1. Voltage $V_{DDH}$ is therefore generally in the range of 10-15VDC.

Figure 2:
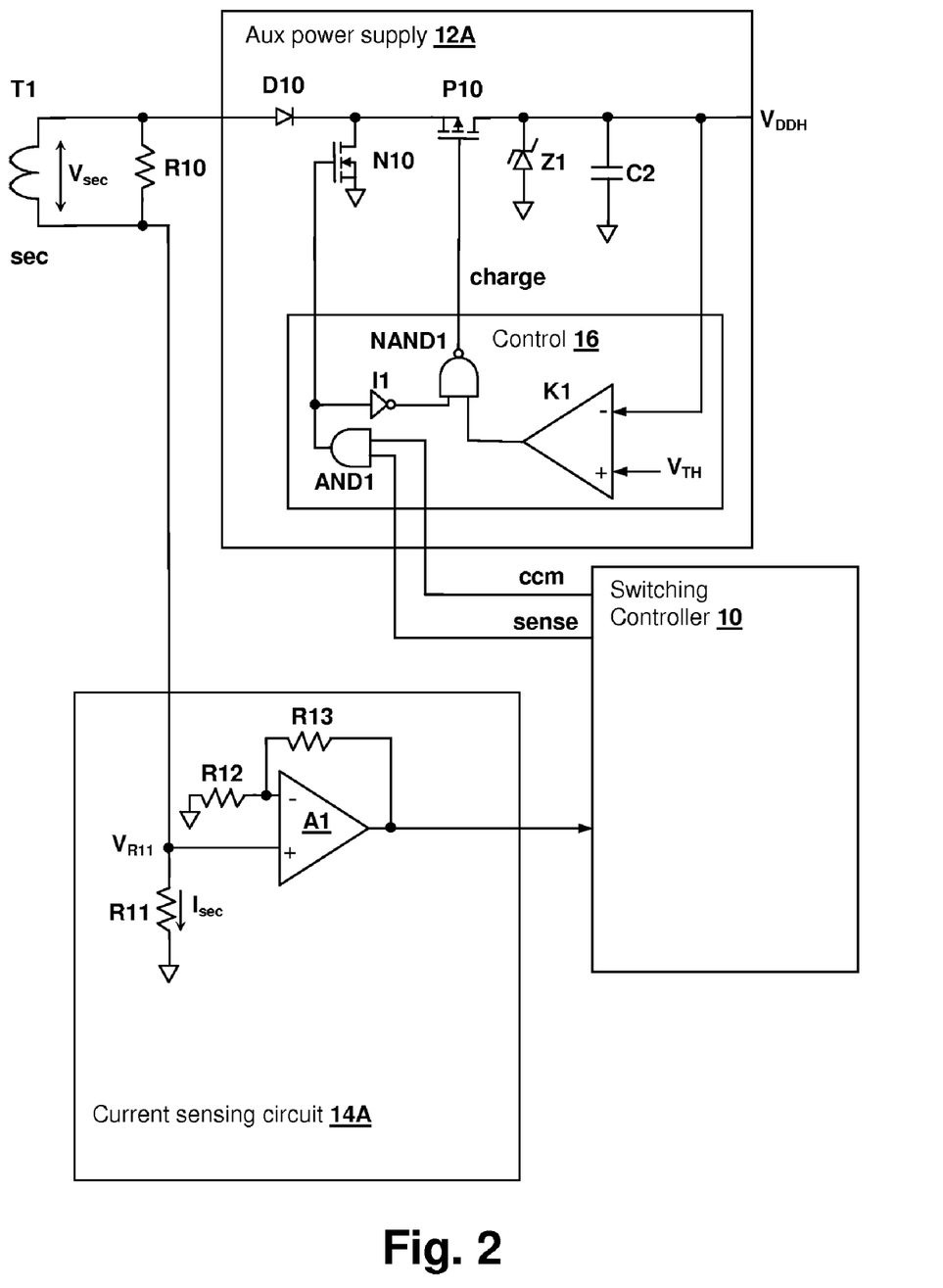
FIG. 2 is a schematic diagram depicting details of a a current sensing circuit 14A and of an auxiliary power supply 12A that can be used to implement current sensing circuit 14 and auxiliary power supply 12 of FIG. 1, respectively, in accordance with an embodiment of the present invention.

Referring now to FIG. 2, details of an auxiliary power supply circuit 12A that may be used to implement auxiliary power supply 12 of FIG. 1 and details of a current sensing circuit 14A that can be used to implement current sensing circuit 14 of FIG. 1 are shown in accordance with an embodiment of the invention. The input of auxiliary power supply 12A is connected to the secondary winding of current sensing transformer T1. A diode D10 provides a half-wave rectifier that conducts only when the current provided from secondary winding sec is in the positive direction, i.e., when inductor L1 is being charged and transistor N1 is conducting. A resistor R10 ensures that when transistor N1 is de-activated and inductor L1 is being discharged, that the magnetization of current-sensing transformer T1 is reset at the end of each cycle. Current sensing circuit 14A includes a resistor R11 connected in series with secondary winding sec to provide a voltage $V_{R11}$ proportional to current $I_{sec}$ to an amplifier A1 having a gain determined by a pair of resistors R12 and R13. The output of amplifier A1 is provided to switching controller 10, which in digital implementations will generally measure the output of amplifier A1 with an analog-to-digital converter (ADC). However, in other analog embodiments of a switching control circuit in accordance with the invention, a peak detector and/or comparator may be used to detect a time at which current $I_{sec}$ reaches a predetermined threshold for indicating to switching controller 10 the appropriate switching period to maintain CCM operation and avoid flux walking. A zener diode Z1 is provided to ensure that output voltage $V_{DDH}$ does not exceed a maximum level, but Zener diode Z1 is not activated normally in auxiliary power supply circuit 12A. The turns ratio of current sensing transformer T1 is generally determined such that voltage $V_{DDH}$ is maintained below a maximum voltage level without activating Zener diode Z1 except under abnormal operating conditions.

Current $I_{sec}$ is measured by current sensing circuit 14A to provide an indication of the magnitude of current $I_L$ through inductor L1 of FIG. 1. However, the magnetization of current sensing transformer T1 produces an error in the direct proportionality of current $I_{sec}$ to current $I_L$, which will be explained in further detail below, along with solutions provided in accordance with various embodiments of the invention, to reduce or correct for the error. In auxiliary power supply 12A, as mentioned above, transformer T1 has a higher secondary to primary turns ratio than ordinary current transformers, so that the higher voltage required to operate switching controller 10 is generated at the output of auxiliary power supply 12A as output voltage $V_{DDH}$. Since the product of voltage $V_{SEC}$ generated across secondary winding sec and the duration of the period for which transistor N1 is active determines the magnetization of the transformer at the end of the active portion of the switching cycle. The magnetization causes an error that reduces the value of current $I_{sec}$ through secondary winding sec below that of an ideal current level as computed from the turns ratio of transformer T1.

The above-described error also reduces the magnitude of the indication of current $I_{sec}$ provided by secondary winding sec to amplifier A1, since the current through resistor R11 will be less than an expected current calculated from the turns ratio of transformer T1. The reduction in current is due to the magnetization current of transformer T1, which is the integral of the voltage across secondary winding sec multiplied by the mutual inductance of transformer T1 (sometimes referred to as the magnetizing inductance). Since voltage $V_{SEC}$ is substantially constant over the switching period, the integral reduces to the product of the mutual inductance, the voltage and the duration of the pulse:

$$I_{sec} = N_{sec}/N_{pri} * I_{pri} - I_{mag} \approx N_{sec}/N_{pri} * I_L - d*V_{sec}/L_M,$$

where $I_{sec}$ is the secondary current, $N_{sec}/N_{pri}$ is the secondary to primary turns ratio, $I_L$ is the primary winding current (i.e., the switching current under measurement) and $I_{mag}$ is the magnetization current. Magnetization current $I_{mag}$ can be approximated by $d*V_{sec}/L_M$, where d is the time period for which transistor N1 is on, $V_{sec}$ is the voltage generated at secondary winding sec and $L_M$ is the mutual inductance of transformer T1. In ordinary current sensing transformer circuits, the term $d*V_{sec}/L_M$ can be ignored, because $V_{sec}$ is small, due to the smaller secondary to primary turns ratio. In the current sensing transformer circuit of the present invention, the error cannot generally be ignored, unless the mutual inductance is made large by increasing the number of turns and providing a sufficiently-sized core, requiring more space and adding cost. The alternative is to provide techniques for eliminating the error, one of which is provided in auxiliary power supply circuit 12A.

Auxiliary power supply circuit 12A includes a control circuit 16 that provides output signals for controlling transistors N10 and P10. Transistor N10 is activated when current sensing circuit 14A is measuring the voltage across resistor R11 to generate the indication of current $I_L$ in inductor L1, which is provided to switching controller 10. Logical-AND gate AND1 controls the gate of transistor N10 so that when switching controller is in CCM mode and signal ccm is asserted and when the sense signal generated by switching controller 10 is active, transistor N10 is turned on. In general, transistor N10 can be activated during DCM operation as well, and there is no requirement that any selection of sensing and charging operations be dependent on whether switching controller 10 is operating in CCM or DCM mode. When activated, transistor N10 substantially reduces the voltage across secondary winding sec to near zero, since only the total voltage of the forward voltage drop across diode D10, the voltage generated across resistor R11 and the drain-source voltage of transistor N10 will be present across secondary winding sec. Resistor R11 can be selected as a low resistance to reduce its voltage drop, and it is desirable to do so in general, since in the depicted circuit, resistor R11 reduces the voltage provided for charging capacitor C2 and therefore reduces the maximum possible value of output voltage $V_{DDH}$.

Transistor N10 is de-activated after a time period determined by signal sense provided from switching controller 10. Signal sense may have a fixed timing determined from the switching period of switching controller 10, or may be controlled in conformity with a determination that the current measurement has been completed, e.g., when current $I_L$ has reached some threshold value as determined by circuits within switching controller 10 in response to the signal provided from current sensing circuit 14A. After signal sense is de-asserted, auxiliary power supply 12A is permitted to charge capacitor C2 from secondary winding sec to provide output voltage $V_{DDH}$. Transistor P10 is activated to permit the charging of capacitor C2 according to a charge signal generated by logical-NAND gate NAND1. Logical-NAND gate NAND1 combines an inverted version of the output signal from logical-AND gate AND1 provided from an inverter I1, with the output of a comparator K1, that is activated only when output voltage $V_{DDH}$ is less than a threshold voltage $V_{TH}$, thereby providing regulation of output voltage $V_{DDH}$ by the action of a comparator K1. As long as output voltage $V_{DDH}$ is at or above threshold voltage $V_{TH}$ for some portion of the duty cycle of switching converter 8 while switching transistor N1 is active and while signal sense is inactive, capacitor C2 will be charged in that duty cycle. Charging of capacitor C2 will generally happen during all of or the later portion of each duty cycle if the loading by controller 10 and other circuits connected to $V_{DDH}$ is sufficient and capacitor C2 is relatively small. Resistor R11 will have a voltage indicative of current $I_L$ in inductor L1 at the end of the sensing portion of the duty cycle before auxiliary power supply 12A starts charging capacitor C2. The indication from the output of current sensing circuit 14A can be sampled at a predetermined time or peak-detected by switching controller 10. Alternatively, multiple sampling points can be gathered from the output of current sensing circuit 14A and used to better indicate to switching controller 10 the shape of a current waveform describing current $I_L$.

While current sensing circuit 14A first measures current $I_L$, and then permits auxiliary power supply circuit 12A to charge the capacitor C2 to maintain output voltage $V_{DDH}$, the order of current sensing and auxiliary power supply charging is generally not restricted. In other embodiments of the present invention, the sensing can be performed after auxiliary power supply output voltage $V_{DDH}$ is replenished, as long as the reference point for the measurement of current $I_L$ is not required to be the peak current or some value in the later portion of the duty cycle. However, performing sensing before substantial magnetization of current transformer T1 has occurred generally requires that sensing be performed first, unless other measures are taken to correct for the magnetization or to remove it.

Figure 3:
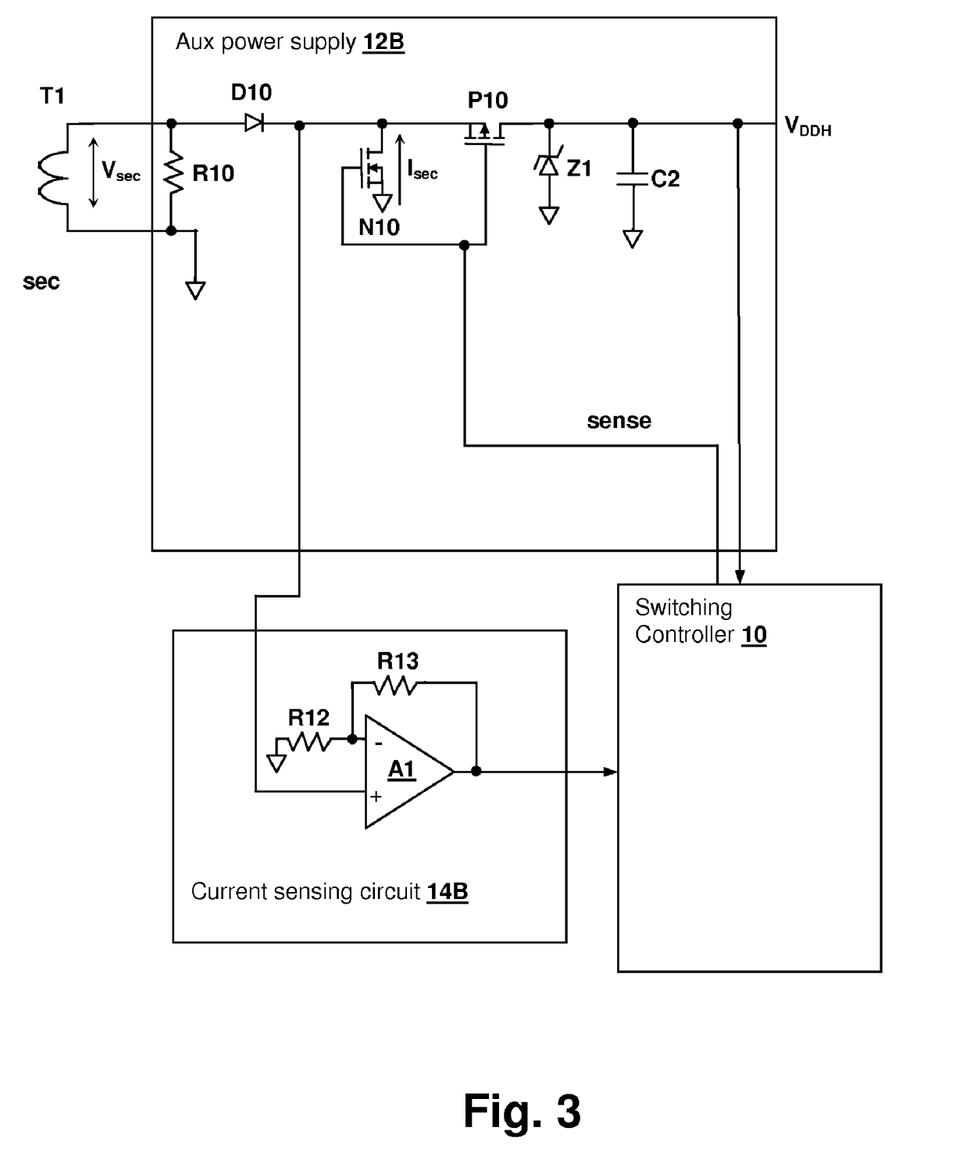
FIG. 3 is a schematic diagram depicting details of a a current sensing circuit 14B and of an auxiliary power supply 12B that can be used to implement current sensing circuit 14 and auxiliary power supply 12 of FIG. 1, respectively, in accordance with another embodiment of the present invention.

Referring now to FIG. 3, details of an auxiliary power supply circuit 12B that may be used to implement auxiliary power supply 12 of FIG. 1 and details of a current sensing circuit 14B that can be used to implement current sensing circuit 14 of FIG. 1 are shown in accordance with an alternative embodiment of the invention. Auxiliary power supply circuit 12B and current sensing circuit 14B of FIG. 3 are similar to auxiliary power supply circuit 12A and current sensing circuit 14A of FIG. 2, and therefore only differences between them will be described below. In auxiliary power supply 12B, control signal sense is provided from switching controller 10, which controls transistors N10 and P10. Control signal sense may or may not be qualified by switching controller 10 being operated in CCM mode, so that sensing is not performed when switching controller 10 is operating in DCM mode. Control signal sense can be asserted first in either polarity, although as mentioned above, sensing is generally performed first with control signal sense being asserted for the first portion of the duty cycle, and the timing can be determined from switching signals within switching controller 10. Alternatively, a result of measuring the output of current sensing circuit 14B can be used to determine when measurement is complete and auxiliary power supply 12B can begin to charge capacitor C2. In such an embodiment, signal sense is asserted at the beginning of a switching duty cycle, reducing the voltage across secondary winding sec and then transistor N10 is subsequently deactivated and transistor P10 is activated to charge capacitor C2. Since switching controller 10 controls the switching cycle of transistor N1, the timing of operation of signal sense can be completely determined. Therefore, current sensing and auxiliary power supply charging could be performed in either order, depending on the relative priority of sensing accuracy and sensing the current every cycle versus maintaining low voltage variation in auxiliary power supply output voltage $V_{DDH}$.

Current sensing circuit 14B differs from current sensing circuit 14A of FIG. 2, in that resistor R11 is omitted, and the voltage generated across transistor N10 by current $I_{sec}$ is used to generate the indication of current $I_L$. The voltage drop of additional resistor R11 is eliminated, reducing the magnetization of current transformer T1 during the entire duty cycle and therefore reducing error due to the magnetization. Eliminating the voltage drop across resistor R11 also provides a higher voltage for charging capacitor C2 during the charging portion of the duty cycle.

Figure 4:
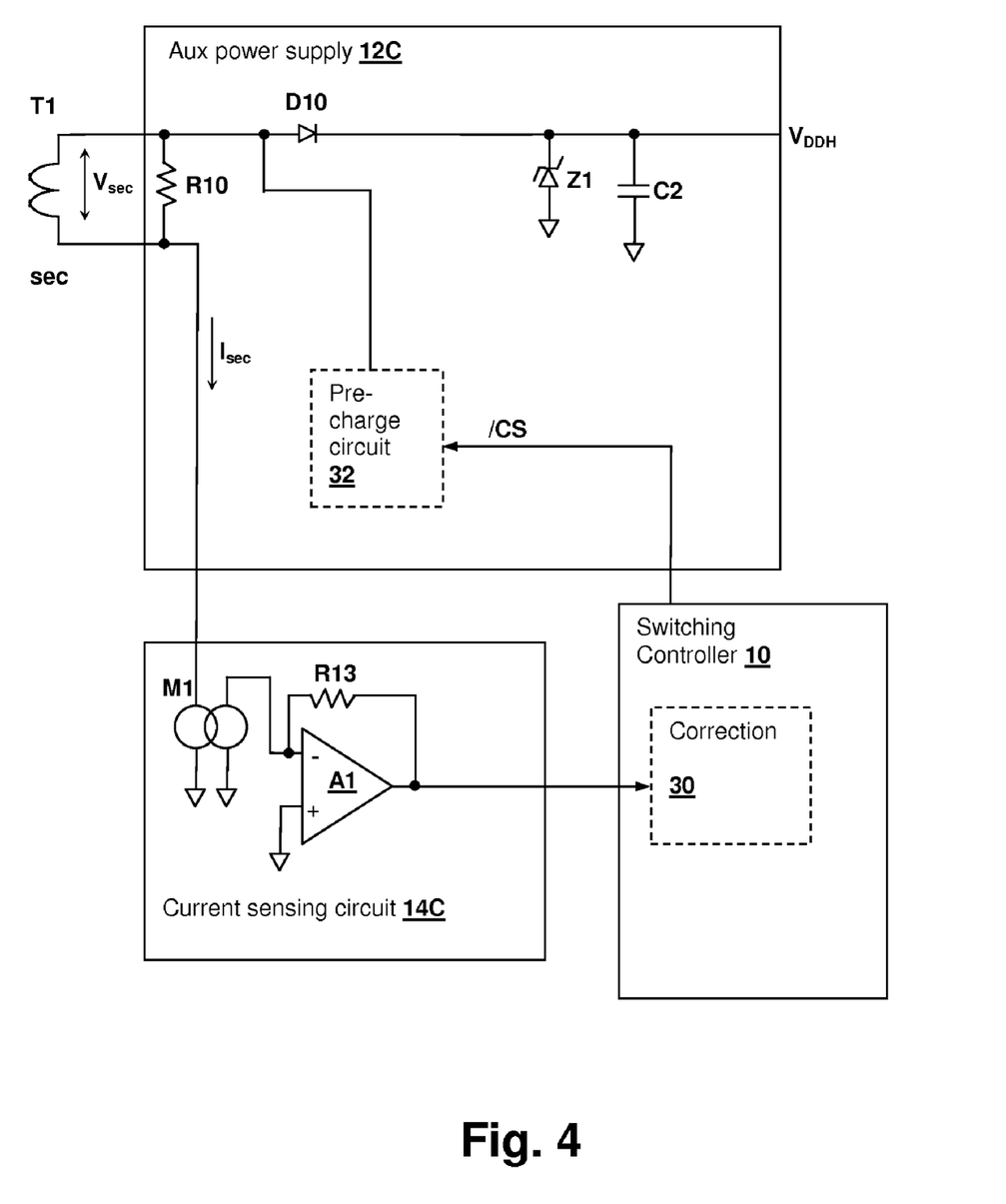
FIG. 4 is a schematic diagram depicting details of a a current sensing circuit 14C and of an auxiliary power supply 12C that can be used to implement current sensing circuit 14 and auxiliary power supply 12 of FIG. 1, respectively, in accordance with yet another embodiment of the present invention.

Referring now to FIG. 4, details of an auxiliary power supply circuit 12C that may be used to implement auxiliary power supply 12 of FIG. 1 and details of a current sensing circuit 14C that can be used to implement current sensing circuit 14 of FIG. 1 are shown in accordance with an alternative embodiments of the invention. Auxiliary power supply circuit 12C can be used to implement auxiliary power supply circuit 12 of FIG. 1. Auxiliary power supply circuit 12C is illustrative of multiple alternative embodiments of the present invention depending on the inclusion or omission of optional elements as described in further detail below. Auxiliary power supply circuit 12C and current sensing circuit 14C of FIG. 4 are similar to auxiliary power supply circuit 12B and current sensing circuit 14B of FIG. 3, and therefore only differences between them will be described below. In one embodiment of auxiliary power supply 12C, an optional pre-charge circuit 32, illustrated as a dashed block, is controlled by a switching signal /CS provided from switching controller 10, which is the complement of control signal CS that activates transistor N1 in switching converter 8 of FIG. 1. At the beginning of a duty cycle, i.e., before control signal CS is asserted, pre-charge circuit 32 charges secondary winding sec to a magnetization that is equal to and has an opposite polarity to the magnetization caused by voltage $V_{SEC}$ produced across secondary winding sec during the duty cycle when transistor N1 is active. No switches or transistors are required in auxiliary power supply 12C, as current sensing circuit 14C receives the correct value of the indication of the current $I_L$ directly from current $I_{SEC}$ as provided to current sensing circuit 14C, and capacitor C2 can be charged for the full duration of the active pulse provided from secondary winding sec.

In an alternative embodiment also illustrated in FIG. 4, pre-charge circuit 32 can be omitted and a optional correction block 30 may be provided in switching controller 10, as indicated by the dashed line block. Correction block 30 computes the error in the indication of current $I_L$ from either a predetermined known value of the mutual inductance of transformer T1 or from a mutual inductance measurement made at start-up or during operation. In another embodiment, correction block 30 may determine the error by comparing the different slopes of $I_{sec}$ during the sensing and charging portions of the duty cycle to estimate an actual magnetization current $I_{MAG}$. The mutual inductance can be measured by driving secondary winding sec with a predetermined voltage and determining the slope of current $I_{sec}$ by observing the rate of decay of current $I_{sec}$ after transistor N1 is deactivated. Alternatively, if transistors, such as transistors N10 and P10 of FIG. 2 and FIG. 3 are provided, the indication of current $I_L$ during two equivalent cycles in DCM mode, one with transistor N10 active and one with transistor P10 active can be compared to determine the error. In such an implementation, transistors N10 and P10 are used only for calibration. Transistor N10 would be deactivated and transistor P10 activated during normal operation, and correction block 30 would directly compensate for the error due to magnetization of transformer T1 by subtracting the measured value of the error from the indication of current $I_L$ produced by current sensing circuit 14.

Current sensing circuit 14C differs from control circuit 14B of FIG. 3, in that a current mirror M1 is used to reflect current $I_{sec}$ into a current-input amplifier formed by amplifier A1 and resistor R13. Therefore, the voltage drop introduced by the sensing circuit is similar to that of transistor N10 in current sensing circuit 14B.

Figure 5:
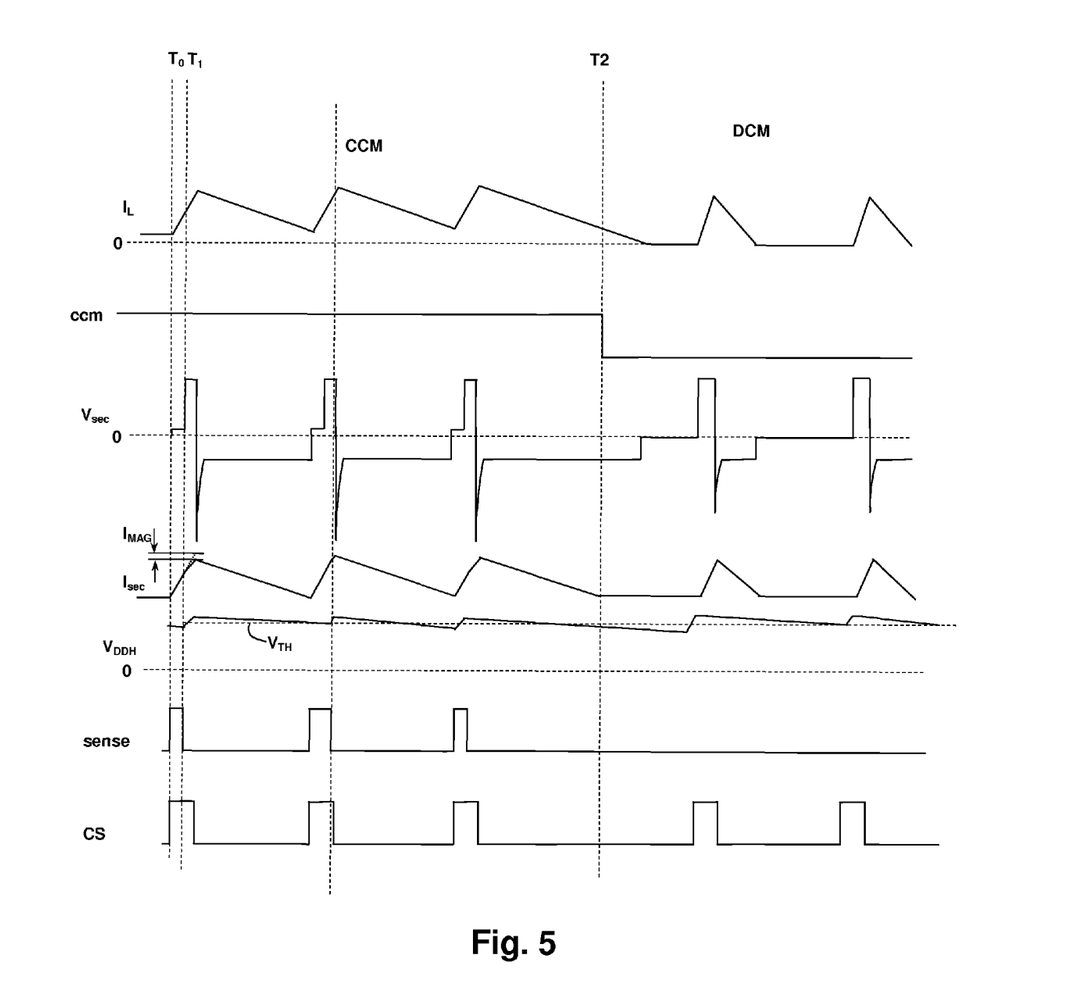
FIG. 5 is a signal waveform diagram depicting details of operation of the switching converter of FIG. 1 in accordance with an embodiment of the invention.

Referring now to FIG. 5, signal waveforms within switching converter 8 of FIG. 1 including an auxiliary power supply 12A of FIG. 2 are illustrated. Other embodiments of the auxiliary power supply have similar output waveforms, but are not directly illustrated. Prior to time $T_2$, switching converter 8 is operated in CCM mode, and signal ccm is asserted. Inductor current $I_L$ increases rapidly during charging phases and decreases more slowly as the energy in inductor L1 is released into capacitor C1. Voltage $V_{sec}$ consists of a positive pulse, a negative transition spike and a lower-voltage negative pulse during the discharge of inductor L1. During the first portion of the positive pulse, current sensing is performed, as indicated by signal sense being in an active state. Transistor N10 clamps voltage $V_{sec}$ to a relatively low value until signal sense is de-asserted. The second portion of the positive pulse, after signal sense is de-asserted and voltage $V_{sec}$ increases to its full potential as determined by the turns ratio of current transformer T1, charges capacitor C2 to restore output voltage $V_{DDH}$ if output voltage $V_{DDH}$ is below threshold voltage $V_{TH}$. After time $T_1$, switching converter 8 operates in DCM mode and the sensing action is suspended, but capacitor C2 is still charged if output voltage $V_{DDH}$ is below threshold voltage $V_{TH}$. Secondary current $I_{sec}$ illustrates a change in slope during the auxiliary supply charging portion of the duty cycle. A current error $I_{MAG}$ represents the difference between a value of current $I_{sec}$ that would be produced with a very low magnetization current, i.e., if transistor N10 were active throughout the duty cycle, and the actual value of $I_{sec}$, which is reduced by the magnetization of current transformer T1.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A switched-power circuit, comprising:
a magnetic coupling element for coupling an input of the switched-power circuit to an output of the switched-power circuit and having at least one winding;
a switching circuit for controlling energizing of a primary winding of the magnetic coupling element from an input voltage source connected to the input of the switched-power circuit;
a current sensing transformer having a primary winding coupled in series with the at least one winding of the magnetic coupling element and the switching circuit, and having a secondary winding;
a control circuit for controlling switching of the switching circuit;
a current sensing circuit coupled to the secondary winding of the current sensing transformer for providing an indication of a magnitude of current conducted through the at least one winding of the magnetic coupling element; and
an auxiliary power supply having an input coupled to the secondary winding of the current sensing transformer and an output coupled to the control circuit for providing a supply voltage to the control circuit.

2. The switched-power circuit of claim 1, wherein the current sensing circuit corrects the indication of the magnitude of the current to compensate for a mutual inductance of the current sensing transformer.

3. The switched-power circuit of claim 2, wherein the current sensing circuit approximates the mutual inductance of the secondary winding of the current sensing transformer from an estimation determined from a measurement of a voltage across the secondary winding of the current sensing transformer.

4. The switched-power circuit of claim 2, wherein the current sensing circuit approximates the mutual inductance of the current sensing transformer from a predetermined value of the mutual inductance of the current sensing transformer.

5. The switched-power circuit of claim 1, wherein the current sensing circuit further comprises a circuit for selectively reducing a voltage across the secondary winding of the current sensing transformer during a measurement interval in which the indication of the magnitude of the current is determined, whereby an effect of a magnetization current of the current sensing transformer on the indication of the magnitude of the current is substantially reduced.

6. The switched-power circuit of claim 5, wherein the auxiliary power supply further comprises a circuit for isolating the output of the auxiliary power supply from the secondary winding of the current sensing transformer when the voltage across the secondary winding is selectively reduced.

7. The switched-power circuit of claim 5, wherein voltage across the secondary winding of the current sensing transformer is only reduced during the measurement interval if the switched-power circuit is operating in continuous conduction mode.

8. The switched-power circuit of claim 1, wherein the auxiliary power supply circuit further comprises a pre-charging circuit for magnetizing the secondary winding of the current sensing transformer prior to a measurement cycle to a value opposite the magnetization current caused by the voltage across the secondary winding, whereby a magnetization current of the current sensing transformer is compensated for by the magnetizing of the secondary winding.

9. A method of operating a switched-power circuit, comprising:
    switching an input voltage source across at least one winding of a magnetic coupling element to transfer power to an output of the switched-power circuit;
    sensing a current flowing through the at least one winding of the magnetic coupling element using a sensing transformer having a primary winding coupled in series with the at least one winding of the magnetic coupling element; and
    generating an auxiliary power supply from the secondary winding of the current sensing transformer for providing a supply voltage to a control circuit of the switched-power circuit.

10. The method of claim 9, further comprising correcting the indication of the magnitude of the current to compensate for a mutual inductance of the current sensing transformer.

11. The method of claim 10, wherein the correcting comprises approximating the mutual inductance of the secondary winding of the current sensing transformer from an estimation determined by measuring a voltage across the secondary winding of the current sensing transformer.

12. The method of claim 10, wherein the correcting comprises approximating the mutual inductance of the current sensing transformer from a predetermined value of the mutual inductance of the current sensing transformer.

13. The method of claim 9, further comprising selectively reducing a voltage across the secondary winding of the current sensing transformer during a measurement interval in which the indication of the magnitude of the current is determined, whereby an effect of a magnetization current of the current sensing transformer on the indication of the magnitude of the current is substantially reduced.

14. The method of claim 13, further comprising isolating the output of the auxiliary power supply during the selectively reducing.

15. The method of claim 13, wherein the selectively reducing only reduces the voltage across the secondary winding of the current sensing transformer during the measurement interval if the switched-power circuit is operating in continuous conduction mode.

16. The method of claim 9, further comprising magnetizing the secondary winding of the current sensing transformer prior to a measurement cycle to a value opposite the magnetization current caused by the voltage across the secondary winding, whereby a magnetization current of the current sensing transformer is compensated for by the magnetizing of the secondary winding.

17. An integrated circuit, comprising:
    a switching control circuit for controlling a switch for charging an external magnetic coupling element through at least one primary winding;
    at least one input terminal for coupling to a secondary winding of a current sensing transformer;
    a current sensing circuit having an input coupled to the at least one input terminal for providing an indication of a magnitude of current conducted through the at least one winding of the external magnetic coupling element; and
    an auxiliary power supply having an input coupled to the at least one input terminal and an output coupled to the switching control circuit for providing a supply voltage to the control circuit.

18. The integrated circuit of claim 17, wherein the current sensing circuit corrects the indication of the magnitude of the current to compensate for a mutual inductance of the current sensing transformer.

19. The integrated circuit of claim 17, wherein the current sensing circuit further comprises a circuit for selectively reducing a voltage across the secondary winding of the current sensing transformer during a measurement interval in which the indication of the magnitude of the current is determined, whereby an effect of a magnetization current of the current sensing transformer on the indication of the magnitude of the current is substantially reduced.

20. The integrated circuit of claim 19, wherein the auxiliary power supply further comprises a circuit for isolating the output of the auxiliary power supply from the secondary winding of the current sensing transformer when the voltage across the secondary winding is selectively reduced.

21. The integrated circuit of claim 19, wherein the voltage across the secondary winding of the current sensing transformer is only reduced during the measurement interval if the switched-power circuit is operating in continuous conduction mode.

22. The integrated circuit of claim 17, wherein the auxiliary power supply circuit further comprises a pre-charging circuit for magnetizing the secondary winding of the current sensing transformer prior to a measurement cycle to a value opposite the magnetization current caused by the voltage across the secondary winding, whereby a magnetization current of the current sensing transformer is compensated for by the magnetizing of the secondary winding.

* * * * *